United States Patent [19]
Schulte

[11] Patent Number: 5,869,764
[45] Date of Patent: Feb. 9, 1999

[54] ULTRASONIC SENSOR

[75] Inventor: Johannes Schulte, Dortmund, Germany

[73] Assignee: Microsonic Gesellschaft für Mikroelektronik und Ultraschalltechnik mbH, Dortmund, Germany

[21] Appl. No.: 817,793

[22] PCT Filed: Sep. 26, 1995

[86] PCT No.: PCT/DE95/01338

§ 371 Date: Mar. 28, 1997

§ 102(e) Date: Mar. 28, 1997

[87] PCT Pub. No.: WO96/10817

PCT Pub. Date: Apr. 11, 1996

[30] Foreign Application Priority Data

Sep. 30, 1994 [DE] Germany .......................... 44 35 156.9

[51] Int. Cl.$^6$ ................................................. G01N 29/00
[52] U.S. Cl. .............................. 73/620; 73/632; 367/140
[58] Field of Search ........................... 73/625, 620, 618, 73/596, 628, 627, 632, 633; 367/909, 99, 151, 140; 364/904; 340/435

[56] References Cited

U.S. PATENT DOCUMENTS

| | | | |
|---|---|---|---|
| 4,104,610 | 8/1978 | Inoue et al. | 367/93 |
| 4,177,679 | 12/1979 | Soldner | 73/625 |
| 4,245,511 | 1/1981 | Soldner | 73/625 |
| 4,636,997 | 1/1987 | Toyama et al. | 367/140 |
| 4,791,430 | 12/1988 | Mills | 343/837 |

FOREIGN PATENT DOCUMENTS

| | | |
|---|---|---|
| 0355490 | 2/1990 | European Pat. Off. |
| 182550 | 3/1907 | Germany . |
| 4218041 | 12/1993 | Germany . |
| 2131642 | 6/1984 | United Kingdom . |
| 8404589 | 11/1984 | WIPO . |

*Primary Examiner*—Hezron E. Williams
*Assistant Examiner*—Richard A. Moller
*Attorney, Agent, or Firm*—Robert W. Becker & Associates

[57] ABSTRACT

An ultrasonic sensor for performing sensing a spatial area and/or measuring contactless a distance has at least one ultrasonic transducer for sending ultrasonic impulses and/or receiving the echo of the ultrasonic impulses. A device for concentrating the energy of the ultrasonic impulses onto a spatial area to be sensed and for concentrating the energy of the echo of the ultrasonic impulses onto the at least one ultrasonic transducer is provided. The device for concentrating the energy has a reflector with a reflective surface. The reflective surface has parabolic surfaces of second order. The reflector comprises reflector segments that are rigidly or movably connected to one another. A first and second reflector segments are outer segments having reflective surfaces that are paraboloid segments of 50° to 120° of a paraboloid of revolution with a first focal point. The paraboloid of revolution is generated by a rotation of a first parabola about an axis of symmetry thereof by an angle of rotation α. A straight line intercepting the axis of symmetry of the first parabola at the first focal point contacts the parabola at a second focal point that is a vertical projection of the first focal point. A third reflector segment is a first inner segment having a reflective surface embodied as a parabolic surface.

11 Claims, 15 Drawing Sheets

FIG. 1
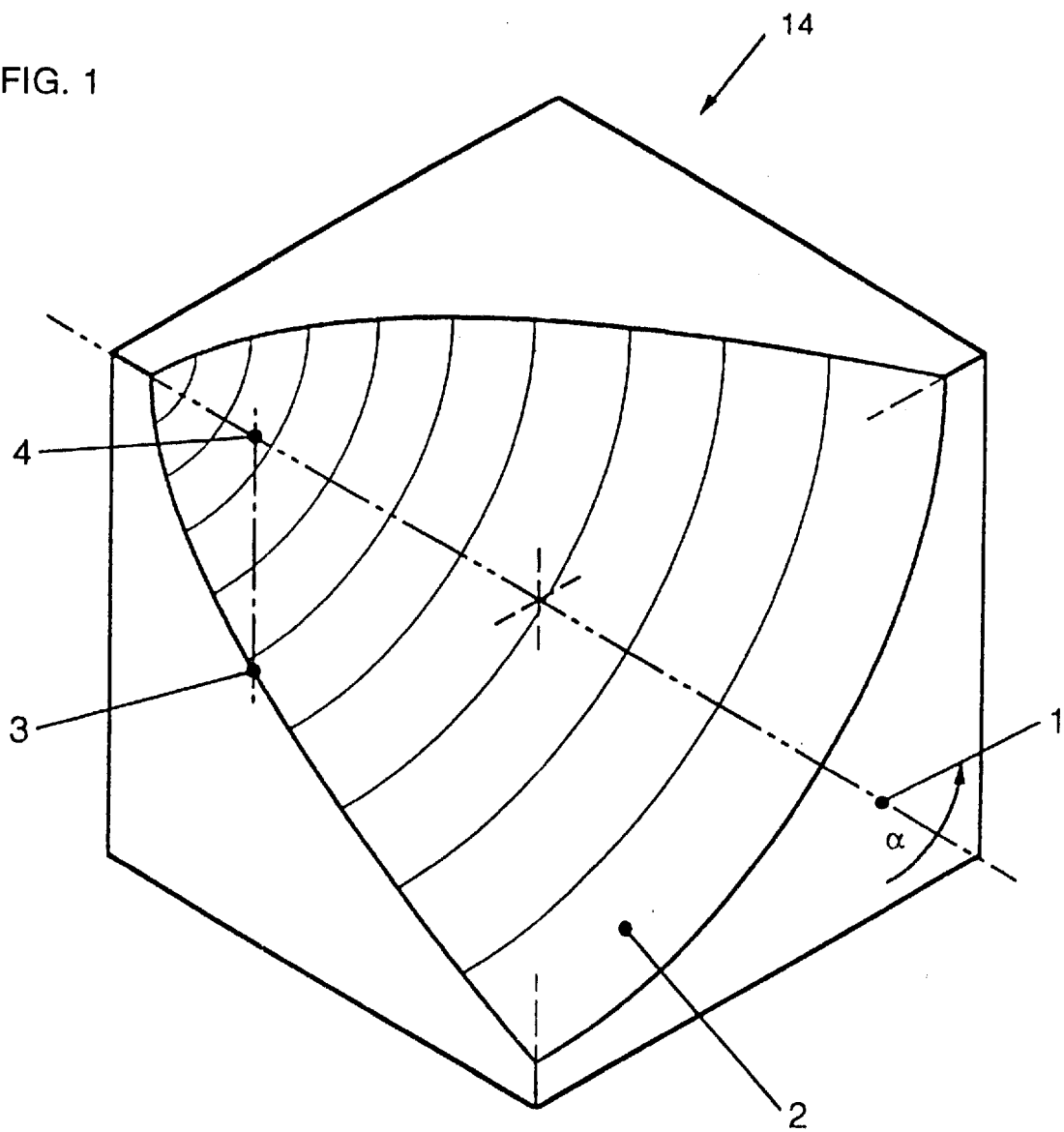
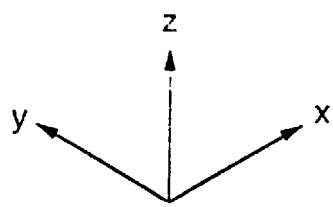

FIG. 4
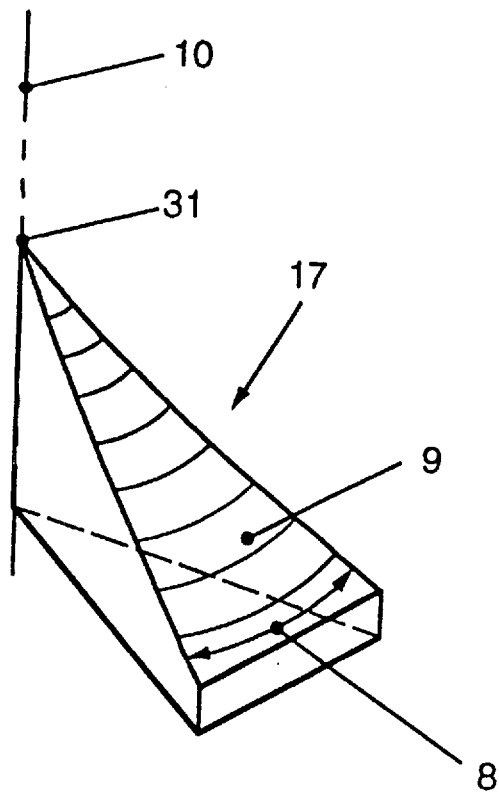
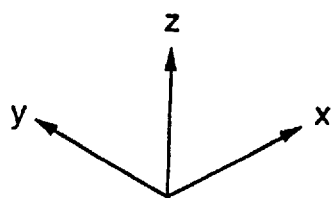

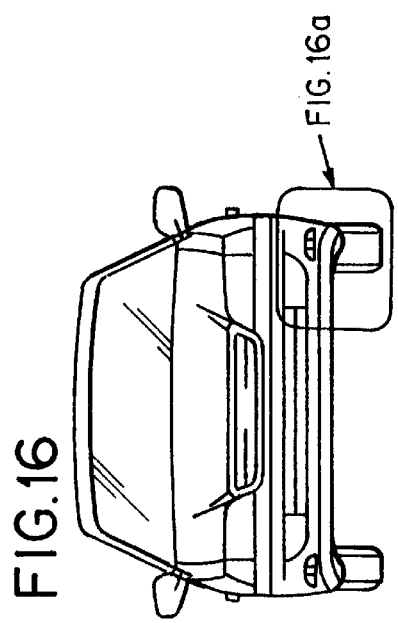
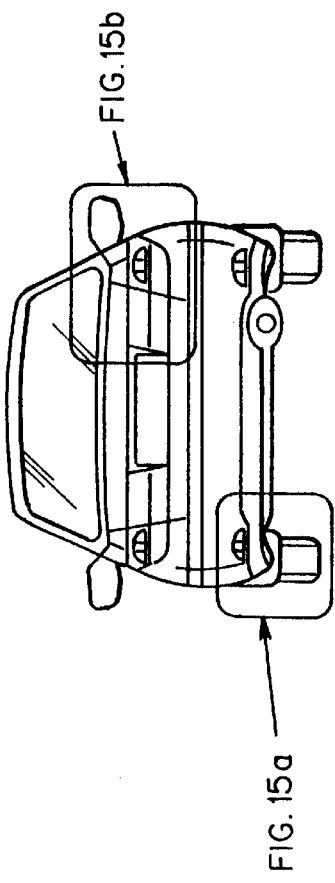
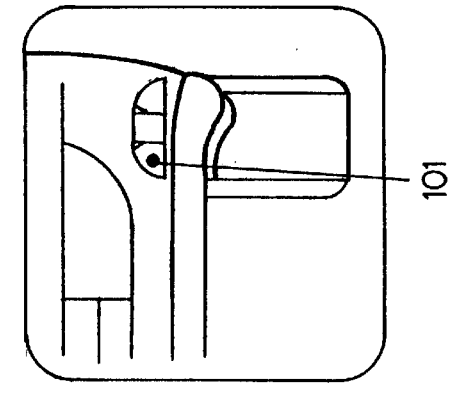
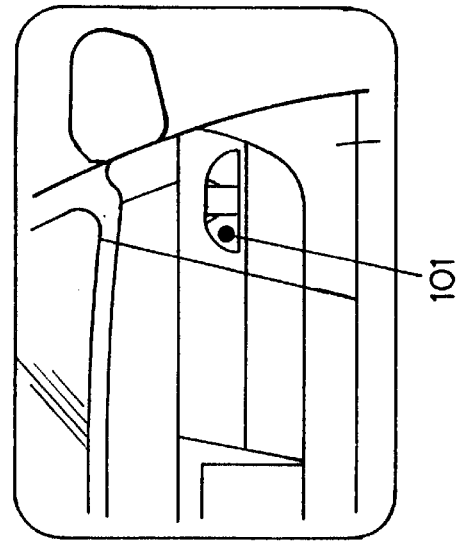
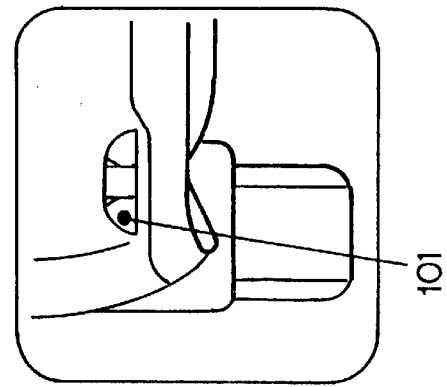

ULTRASONIC SENSOR

BACKGROUND OF THE INVENTION

The invention relates to an ultrasonic sensor for sensing a spatial area and/or for contact-free distance measuring with at least one ultrasonic transducer for sending ultrasonic impulses and/or receiving the echo of ultrasonic impulses and a device for concentrating the energy of the ultrasonic impulses onto the spatial area to be sensed, respectively, of the energy of the echo of the ultrasonic impulses onto the ultrasonic transducer or transducers.

An ultrasonic sensor comprises, for example, at least one ultrasonic transducer which transforms electrical energy into sound and, in reverse, sound into electrical energy, a housing enclosing the ultrasonic transducer or transducers, an electrical connection and, optionally, an electronic circuit for signal processing also enclosed in the housing.

In order to sense a spatial area, respectively, to measure the distance between two points, conventionally an ultrasonic sensor is positioned at a suitable point and is directed onto the corresponding spatial area which is to be sensed, respectively, in which a body to be detected is present the distance of which to a reference point is to be determined. The ultrasonic sensor comprises an ultrasonic transducer which emits ultrasonic impulses and, optionally, receives the echo of the ultrasonic impulses reflected at the body. In the case of receiving an echo, the distance between the ultrasonic sensor and the body positioned within the spatial area that has been detected is determined with a computing circuit (echo propagation time measurement). Instead of an ultrasonic transducer a plurality of such ultrasonic transducers can be used whereby the function of the respective ultrasonic transducer may be limited to emitting the ultrasonic impulses, respectively, to receiving the echo of the ultrasonic impulses.

An ultrasonic sensor is known from German Patent Application 42 18 041 A1. An ultrasonic sensor for distance measurement comprises at least one ultrasonic transducer for sending a working sound impulse and for receiving the echo. The ultrasonic transducer is surrounded by a sound deflecting surface onto which the ultrasonic impulses of the ultrasonic transducer are impinged. In the sound reflecting surface a further ultrasonic transducer is arranged. It, in connection with a computing unit arranged downstream, has the task to monitor the ultrasonic transducer with respect to its proper function. In the disclosed sound deflecting surface the sound field is substantially only deflected. However, the sound field is not shaped and oriented in a defined manner.

Conventional ultrasound sensors have for certain applications the disadvantage that their sound field is of radial symmetry. Such ultrasonic sensors are, for example, mounted in or at the rearward bumper of a passenger car in order to indicate to the driver, when backing up, possible obstacles behind the vehicle. For this purpose, the ultrasonic sensors are, in general, controlled by a central control device which controls the sensors and processes the echo signals. Depending on the measured distance, an optical and/or acoustic signal is delivered to the driver. The ultrasonic sensors are designed to sense gap-free the area behind the vehicle across the entire vehicle width up to a distance of, for example, 180 cm. Since however low curbs or rough street surfaces should not deliver a signal, a plurality of ultrasonic sensors are required due to the radial-symmetrical sound fields of conventional ultrasonic sensors.

In order to provide for the best possible ground clearance, it would be necessary to employ a plurality of ultrasonic sensors with sound cones as narrow as possible. However, this is disadvantageous because of the high cost for the ultrasonic sensors and detrimental to the visual impression of the vehicle. Today's solutions provide a comprise of gap-free sensing with sufficient ground clearance and number of ultrasonic sensors required therefore.

In order to define the requirements in regard to such a parking aid, also called maneuvering warning device, the German Institute of Standards e.V. DIN has produced a standard suggestion for use with payload vehicles. In the standard proposal DIN 75 031 of May 1993 especially the requirements for the spatial area to be monitored behind the vehicle were determined. To this date, no ultrasonic sensors are available on the market which fulfill the requirements disclosed therein.

It is an object of the invention to provide an ultrasonic sensor with defined asymmetric radiation characteristic and a device for monitoring the proper function of the ultrasonic sensors as well as to suggest suitable applications of the ultrasonic sensors.

It is desired that the sending and receiving characteristic have sharp contours. It is also desired that the emitted sound field of the ultrasonic sensors in the case of spatial monitoring at vehicles, especially for exterior space monitoring, be embodied such that the detection range at the side facing the ground surface is substantially parallel and allows enough ground clearance. At the same time, the ultrasonic transducer should be small in size in order to allow the mounting at different locations, without requiring retrofitting or considerable adaptations of the location to the ultrasonic sensor as has been conventionally necessary.

SUMMARY OF THE INVENTION

The ultrasonic sensor for performing at least one function selected from the group of sensing a spatial area and of measuring contactless a distance according to the present invention is primarily characterized by:

- at least one ultrasonic transducer for performing at least one function selected from the group of sending ultrasonic impulses and receiving the echo of the ultrasonic impulses;
- a device for concentrating the energy of the ultrasonic impulses onto a spatial area to be sensed and for concentrating the energy of the echo of the ultrasonic impulses onto the at least one ultrasonic transducer;
- the device for concentrating the energy having a reflector with a reflective surface;
- the reflective surface comprised of parabolic surfaces of second order;
- the reflector comprising reflector segments that are rigidly or movably connected to one another;
- wherein a first and a second reflector segments are outer segments having reflective surfaces that are paraboloid segments of 50° to 120° of a paraboloid of revolution with a first focal point, the paraboloid of revolution generated by a rotation of a first parabola about an axis of symmetry thereof by an angle of rotation $\alpha$;
- wherein a straight line, intercepting the axis of symmetry of the first parabola at the first focal point, contacts the first parabola at a second focal point that is a vertical projection of the first focal point;
- wherein a third reflector segment is a first inner segment having a reflective surface embodied as a parabolic surface.

The reflective surface of the first inner segment is a portion of a surface generated by rotation of a second parabola about a rotation axis defined as a straight line extending perpendicularly to an axis of symmetry of the second parabola through a third focal point of the second parabola and intercepting the second parabola at a fourth focal point that is a vertical projection of the third focal point, wherein the reflective surface of the first inner segment begins at the fourth focal point and extends in a direction away from the vertex of the second parabola.

The rotation of the parabola about a rotation axis is carried out with an angle $\psi$.

The outer and the inner segments are arranged such that the first and third focal points coincide and the second and fourth focal points coincide, wherein the reflective surfaces of the outer and the inner segments form a substantially continuous surface, wherein the at least one ultrasonic transducer has an active surface and wherein the active surface is arranged such that its center point coincide with the first and third focal points.

A main beam direction of the at least one ultrasonic transducer is oriented toward the second and fourth focal points.

A fourth reflector segment is a second inner segment and a fifth reflector segment is a center piece, wherein the center piece has a reflective surface that is a portion of a parabolic surface generated by linear displacement of a vertically extending parabola having an axis of symmetry extending horizontally.

The vertically extending parabola has a fifth focal point, and a straight line, extending perpendicularly to the axis of symmetry at the fifth focal point, intercepts a sixth focal point that is a projection of the fifth focal point.

The center piece is arranged with one of the outer segments and one of the inner segments such that the first, third and fifth focal points coincide and the second, fourth and sixth focal point coincide, wherein the reflective surfaces of the outer and inner segments and the center piece form a substantially continuous surface. Furthermore, the center piece is arranged with the other of the outer segments and the other of the inner segments such that the first, third and fifth focal points coincide and the second, fourth and sixth focal point coincide, wherein the reflective surfaces of the outer and inner segments and the center piece form a substantially continuous surface.

The active surfaces of the ultrasonic transducers are arranged such that the center points coincide with the first, third, and fifth focal points, and the main beam direction of the ultrasonic transducers is oriented toward the second, fourth, and sixth focal points, wherein the ultrasonic transducers have a sound (sonic) cone with an opening angle of 5° to 120°.

The outer segments are rotatable by an angle $\chi$ about an axis extending through the first, third, and fifth focal points and the second, fourth, and sixth focal points, wherein the angle $\chi$ is identical to the angle $\psi$ of the first inner segment.

The reflective surfaces of the outer segments are paraboloid segments of 90° of a paraboloid of revolution.

The reflector is preferably mirror-symmetrical.

The angle of rotation $\psi$ advantageously corresponds to the amount of the opening angle $\psi$ of 0° to 180°, preferably 0° to 90°, more preferred 25° to 45°, and in particular 30°, 35° or 40°.

Thee opening angle of the sound or sonic cone of the ultrasonic transducer is 5° to 120°, preferably 50° to 80°.

The inner segment or segments are expediently expandable.

The outer segment is preferably pivotable by an angle of rotation $\beta$ about a common axis which extends through the first and third focal points and the projected second and fourth focal points.

The angle of rotation $\beta$ corresponds to the amount of the opening angle $\psi$ of the inner segment.

The depth t of the reflective surface is preferably two to twenty fold the wavelength of the used ultrasonic frequency.

The ultrasonic transducer is connected to one or more control units for controlling, controls for the ultrasonic transducers and the reception and amplification of the echo signals, evaluation devices for evaluating the transformed impulses of the ultrasonic transducer, display devices for displaying the detected values and/or transmitting devices.

The frequency range of the ultrasonic impulses is preferably between 20 to 200 kHz, preferably 30 to 50 kHz, more preferred 33 kHz or 40 kHz.

According to the present invention, the ultrasonic sensor (s) can be used as monitoring devices in and/or external to spaces of motor vehicles or payload vehicles and buildings, whereby these spaces are preferably passenger compartments of motor vehicles or payload vehicles.

The inventive ultrasonic sensors can also be used as a running board monitoring device of motor vehicles or payload vehicles, especially garbage trucks, or as a monitoring device at doors and gates.

The ultrasonic sensors can be arranged respectively at the left and/or the right side of the front end and/or the rear end of a vehicle for sensing the rearward, forward and/or lateral area of the vehicle across the entire width of the vehicle. They can also be arranged or integrated in a front light and/or a signal light of the vehicle. Of course, they can also be arranged in the rear light of a vehicle.

Another preferred location of arrangement is in, on and/or below bumpers of the vehicle or the running board of a vehicle.

The invention relates to an ultrasonic sensor for sensing a spatial area and/or for contact-free distance measuring with at least one ultrasonic transducer for sending ultrasonic impulses and/or receiving the echo of ultrasonic impulses and a device for concentrating the energy of the ultrasonic impulses onto the spatial area to be sensed, respectively, of the energy of the echo of the ultrasonic impulses onto the ultrasonic transducer or transducers, which is characterized in that the device for concentrating the energy of the ultrasonic impulses has a reflector with reflective surface which is embodied as a parabolic surface of nth order, preferably second order.

A further embodiment of the present invention relates to a vehicle that is characterized in that the vehicle has one or more of the inventive ultrasonic sensors.

A further embodiment of the present invention is directed to the application of the inventive ultrasonic sensors as a monitoring device within and/or exterior to the interior of passenger vehicles or payload vehicles, especially of ground transportation and buildings.

A further embodiment of the present invention relates to the application of the inventive ultrasonic sensors as a running board monitoring device of passenger vehicles or payload vehicles, especially garbage trucks, as well as a monitoring device at doors and gates.

BRIEF DESCRIPTION OF THE DRAWINGS

Further details, aspects, and advantages of the present invention will result from the following description in conjunction with the drawings. It is shown in an illustrated simplification in a schematic greatly enlarged view, without claim to a scale-true representation, in FIG. 1 the perspective representation of the outer segment of the inventive ultrasonic sensor;

FIG. 4 the perspective representation of the inner segment of the inventive ultrasonic sensor;

FB vehicle width 250 cm

BF reference plane vehicle rear

US inventive ultrasonic sensor

EB allowed area in which the testing body may still be detected (see standard proposal DIN 75 031 of May 1993)

Figure 13A:
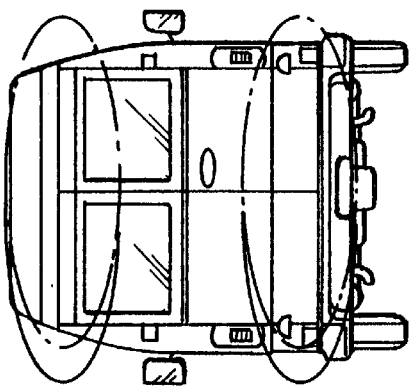
Figure 13:
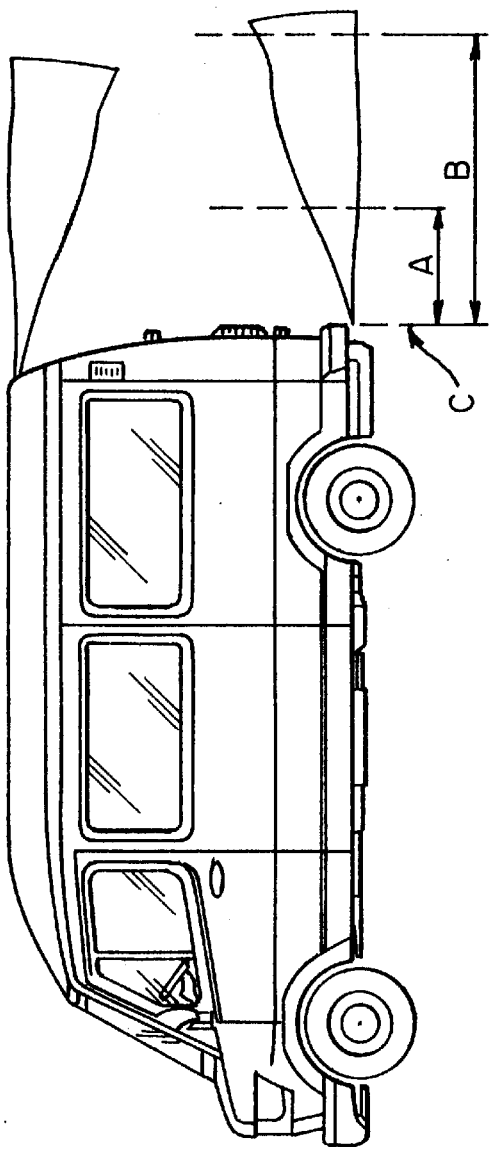
Figure 13B:
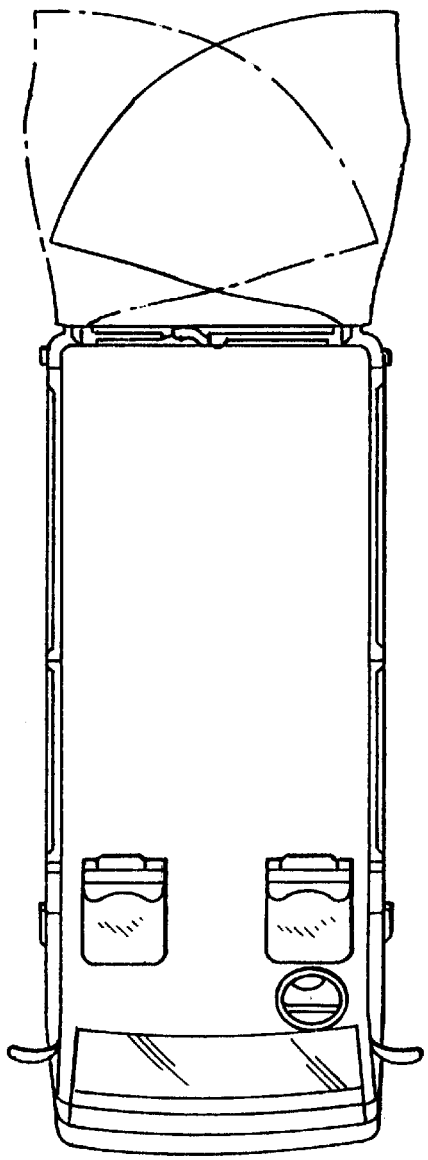

● position of the vertically arranged testing body (tube of approximately 150 cm length and a diameter of 7 cm) according to DIN proposal 75 031 of May 1993;

FIG. 13 plan view (FIG. 13b), side view, and end view (FIG. 13a) from behind of a transporter, furnished with four inventive ultrasonic sensors for securing the rearward area of the vehicle in two planes according to DIN proposal 75 031 of May 1993

A: collision range 700 mm

B: main warning range 1800 mm

Figure 14D:
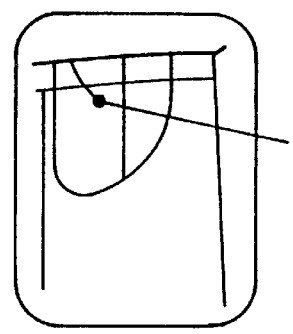
Figure 14C:
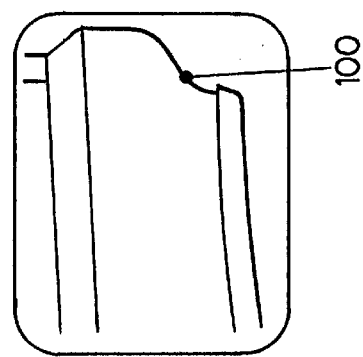
Figure 14:
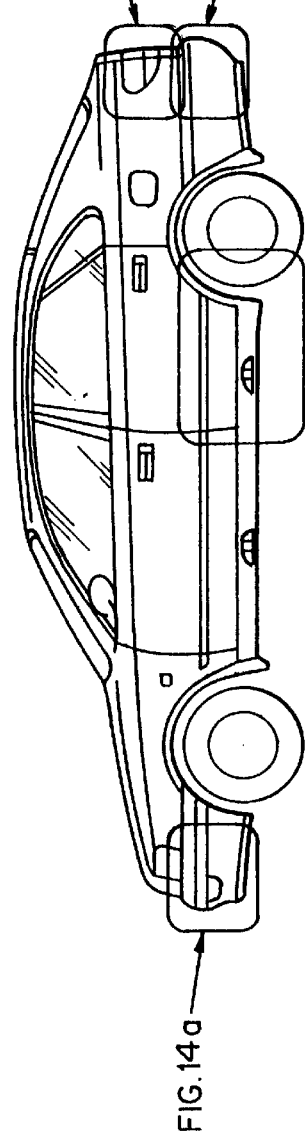
Figure 14B:
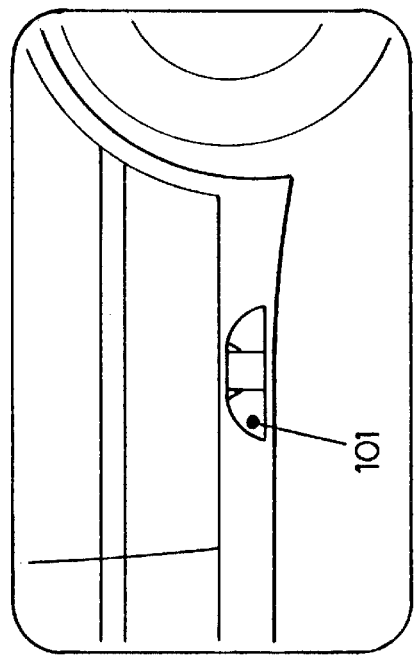
Figure 14A:
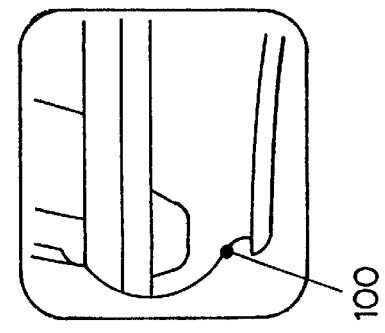

C: reference plane vehicle rear;

FIG. 14 examples (FIGS. 14a–14d) for the mounting of the inventive ultrasonic sensors at a passenger vehicle for securing the rear, the side and/or the front; and FIG. 15 examples (FIGS. 15a, 15b) for mounting of the inventive ultrasonic sensors at a passenger vehicle for securing the side and the rear;

FIGS. 16 and 16a show an example for mounting the inventive ultrasonic sensor at a passenger vehicle for securing the front of the vehicle.

DESCRIPTION OF PREFERRED EMBODIMENTS

The device for concentrating the energy of ultrasonic impulses is controllable with respect to concentrating the energy of the ultrasonic impulses onto a spatial area to be sensed, respectively, the energy of the echo of the ultrasonic impulses onto the ultrasonic transducer or transducers. By varying the reflectors of the ultrasonic sensors, the concentration of energy of the emitted as well as the reflected ultrasonic impulses reflected at a body and thus optionally the sensitivity of the ultrasonic sensor can be changed. The inventive ultrasonic sensor comprises such an asymmetric radiation characteristic that the sound field in the horizontal plane is widened and in the vertical plane is strongly focused.

The device for concentrating the energy of the ultrasonic impulses comprises a reflector the reflective surface of which is embodied as a parabolic surface of nth order, preferably second order. Accordingly, the energy of the emitted as well as of the reflected ultrasonic impulses reflected at a body is concentrated onto a certain spatial area.

In order to produce in the horizontal plane a symmetric sensing characteristic, the reflector may be embodied mirrorsymmetrically. The variation of the width of the sensing area is achieved effectively such that the reflector comprises a plurality of segments movable relative to one another the position of which can be changed relative to one another.

Figure 10:
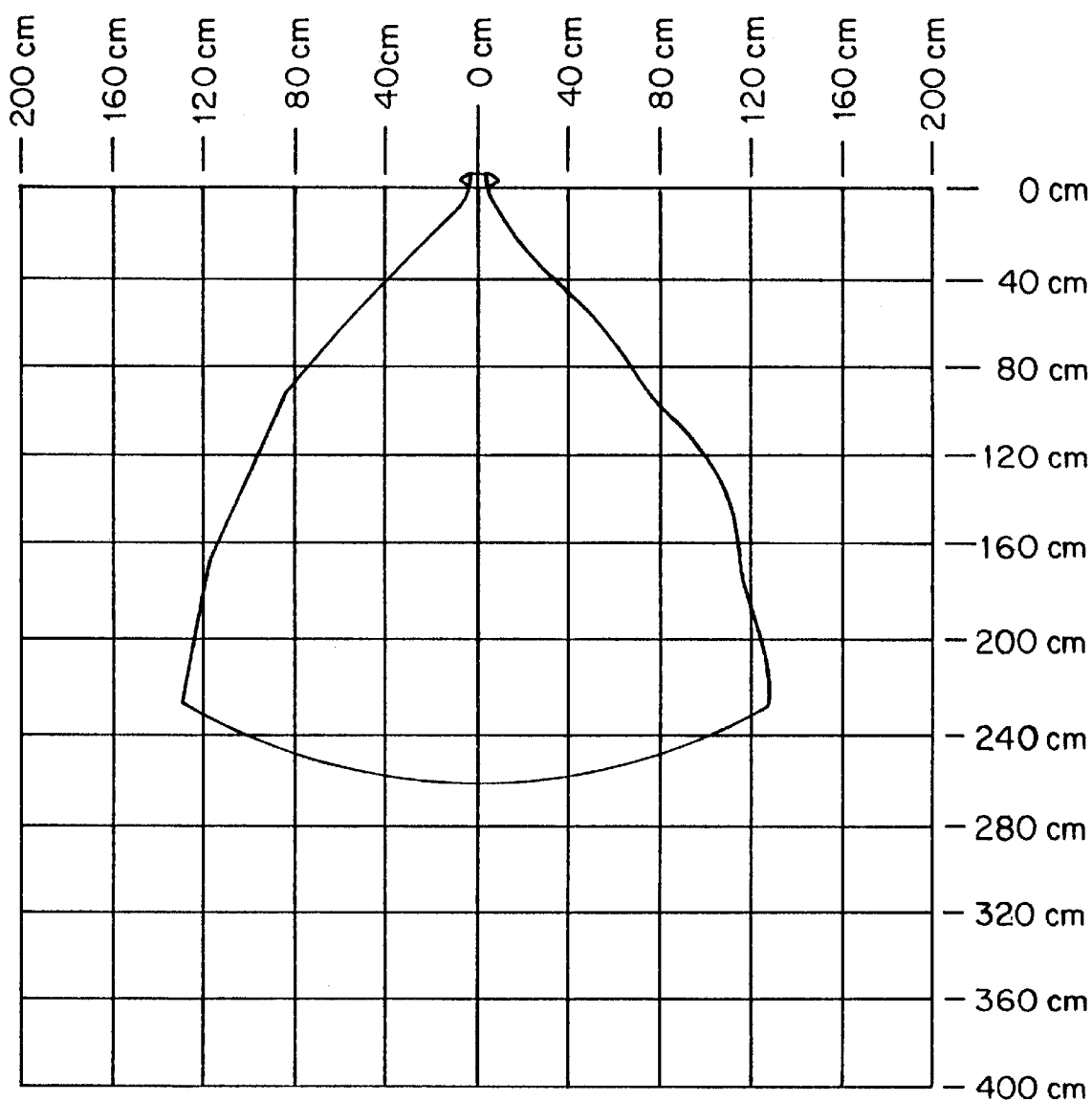
FIG. 10 the horizontal sensing area of the inventive ultrasonic sensor with a tube having a length of approximately 150 cm and a diameter of 7 cm.
Figure 11:
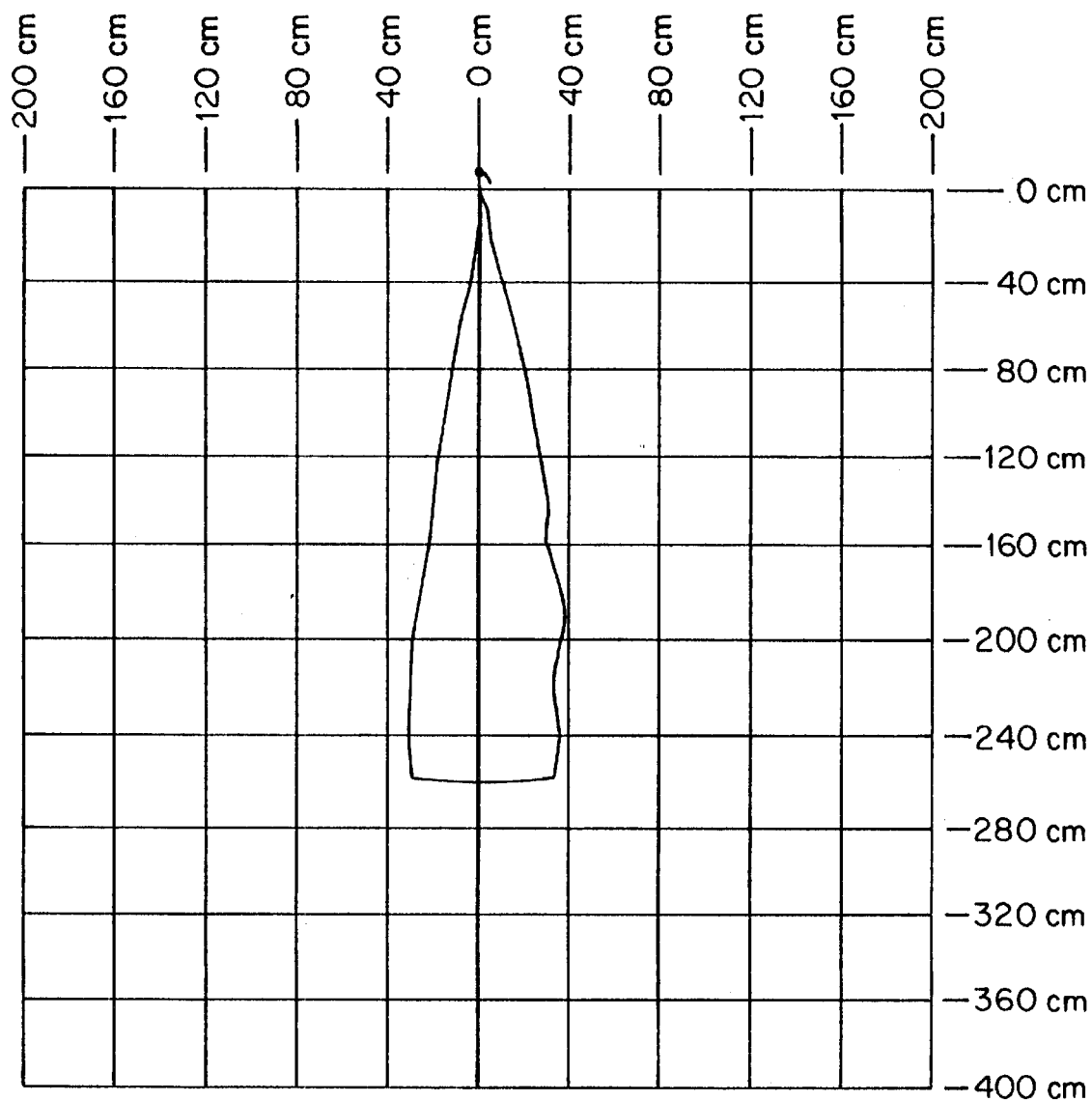
FIG. 11 the vertical sensing area of the inventive ultrasonic sensor measured with a tube having a length of approximately 150 cm and a diameter of 7 cm.
Figure 12:
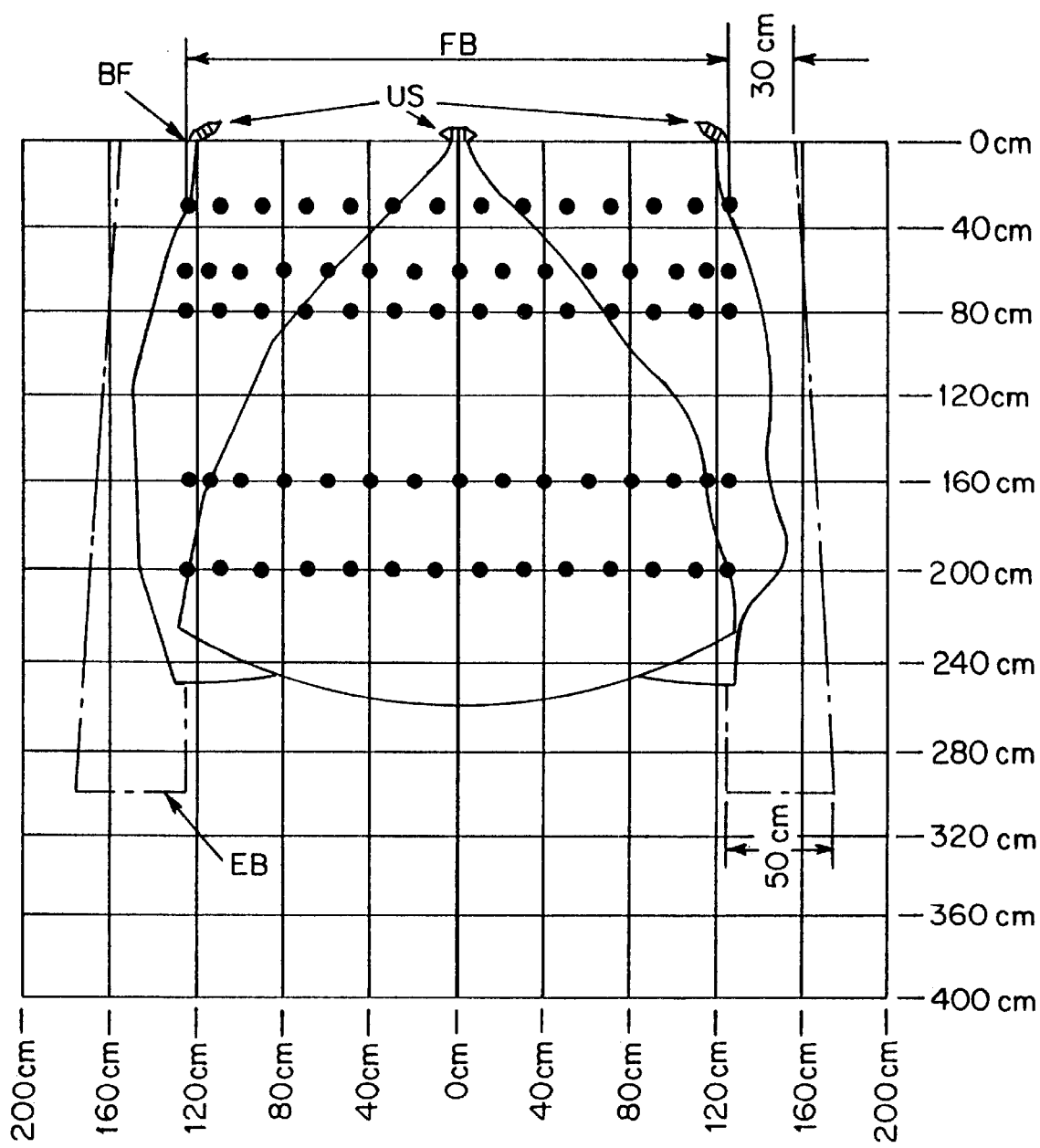
FIG. 12 the horizontal sensing area of three inventive ultrasonic sensors, positioned for the rearward safety of a vehicle of 250 cm width, measured with a tube having an length of approximately 150 cm and a diameter of 7 cm as well as the testing points according to DIN proposal 75 031 of May 1993

The main advantage of the invention is that a sound field of an asymmetric ratio horizontal to vertical plane (FIG. 10 and FIG. 11) is provided which in the past has been held to be impossible. The inventive ultrasound sensor is arranged at the origin of the coordinate system. An electronic evaluation device operates the ultrasonic sensor according to the echo propagation time method. The electronic evaluation device sends a starting signal when the reflector body (here a tube having a length of 1.5 m and a diameter of 7 cm) is detected by the ultrasonic sensor. The gray area indicates the area in which the reflector body can be detected by the ultrasonic sensor. When two or three of the inventive ultrasonic sensors are arranged at the rear of the vehicle such that the horizontal detecting areas completely and without gaps illuminate the entire width of the vehicle (FIG. 12) and the narrow vertical detecting range extends substantially parallel to the ground surface, disturbing reflections at a rough surface or at low curbs are avoided (FIG. 13). This ability of the inventive ultrasonic sensor, i.e., the asymmetrically designed embodiment of the detecting area, which is unexpected for the person skilled in the art, eliminates the previously cumbersome alignment of conventional ultrasonic sensors without increasing the required number for a gap-free securing of the vehicle width.

The design of the inventive ultrasonic sensors allows furthermore sharp contours in the horizontal as well as in the vertical plane of the detecting area so that disturbing reflections are avoided past the range of the asymmetric detecting area.

When, furthermore, within the ultrasonic sensor instead of an individual ultrasonic transducer separate ultrasonic transducers for sending the sound impulse and for receiving the echo signals are used, then it is possible a) to reduce advantageously the typical near range of ultrasonic sensors which operate by echo impulse function and b) inventively to use a method for monitoring the proper function of the ultrasonic transducer.

A further advantageous method for monitoring the ultrasonic transducer results from the use of the wide detecting area of the ultrasonic sensor in the horizontal plane such that with a suitable arrangement of at least two inventive ultrasonic sensors a mutual monitoring is made possible.

Figure 6:
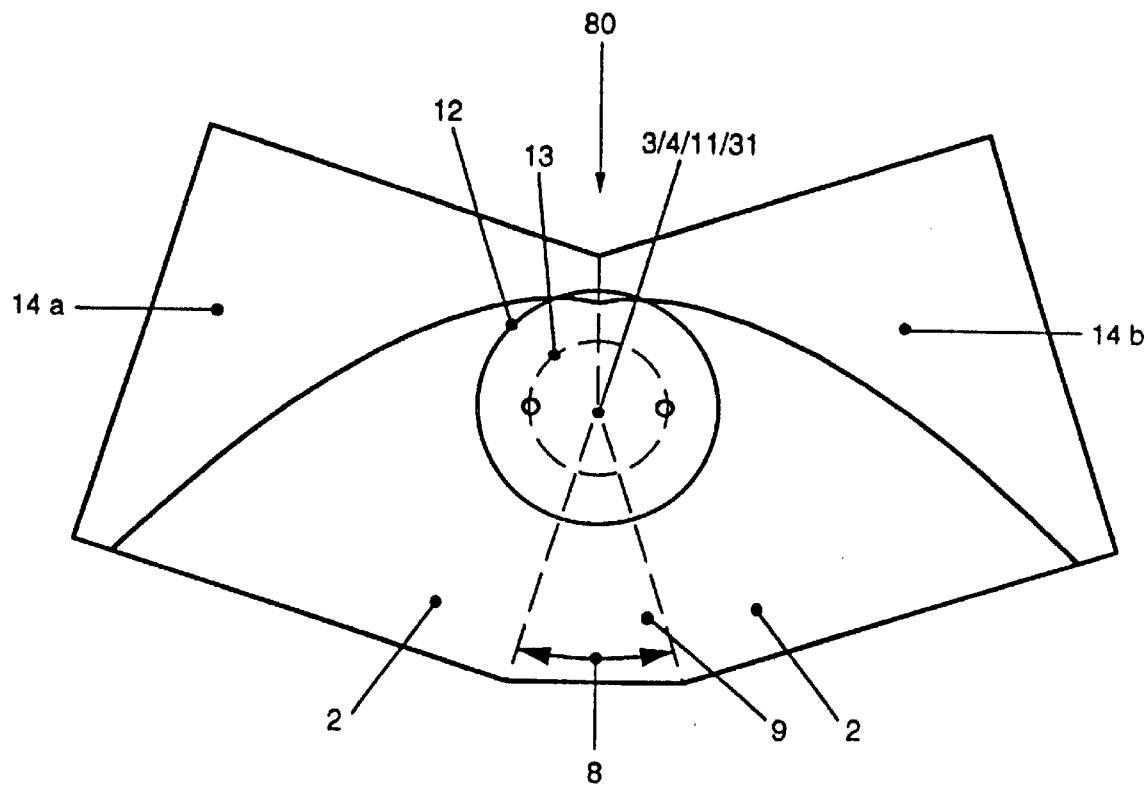
FIG. 6 the plan view of the inventive ultrasonic sensor with two outer segments, an inner segment and an ultrasonic transducer.
Figure 7:
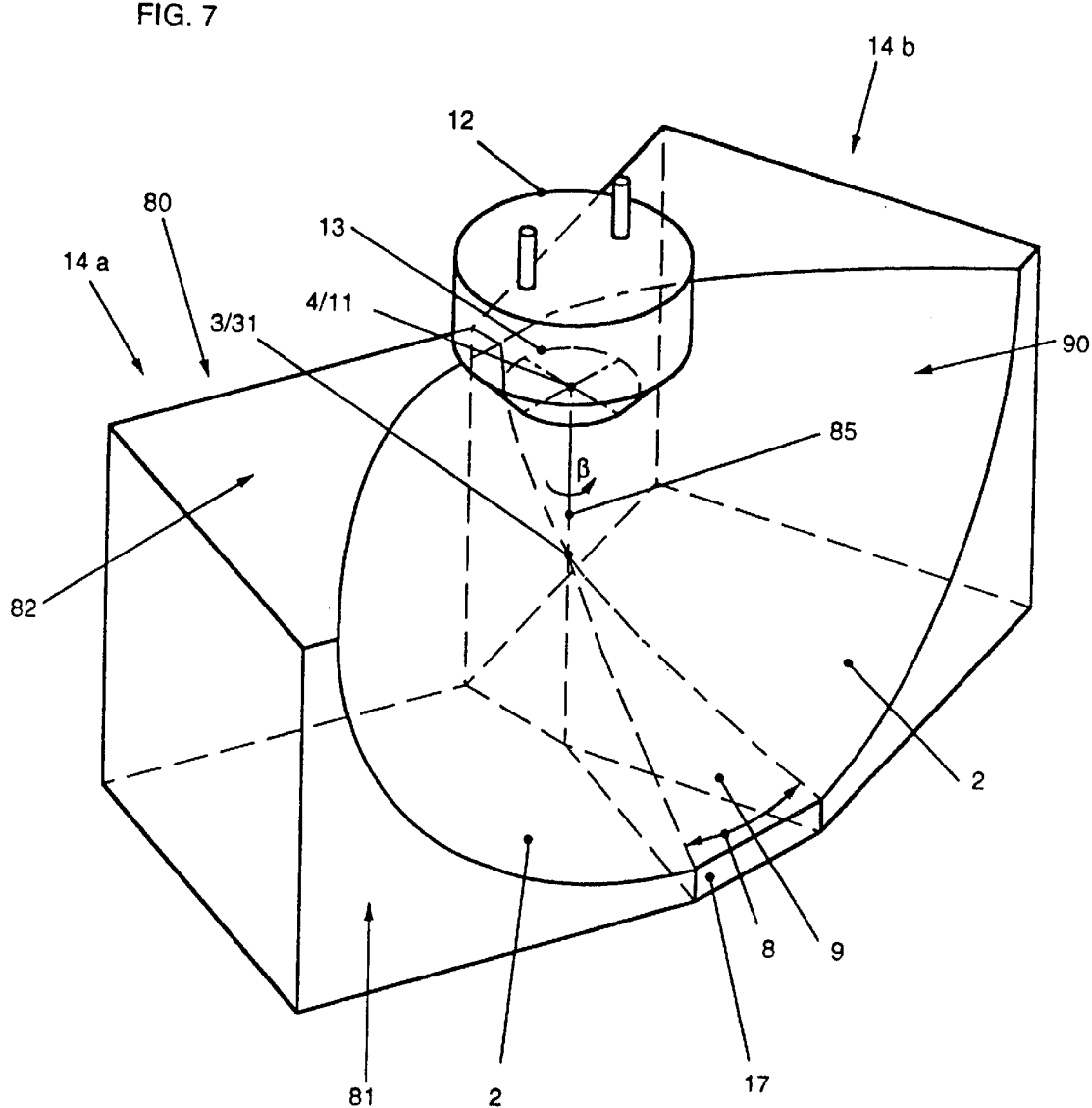
FIG. 7 the perspective representation of the inventive ultrasonic sensor with two outer segments, an inner segment, and an ultrasonic transducer.

In the following a description of a preferred construction of the inventive ultrasonic sensor is given:

To an inner segment 17 of the reflector, the reflective surface 9 of which is embodied as a parabolic surface, are connected lateral outer reflector segments 14a, 14b (FIG. 6 and FIG. 7) the reflective surfaces 2 of which are embodied as rotation-parabolic surfaces. The outer segments 14a, 14b have advantageously reflective surfaces 2 as sections of 50° to 120°, preferably 90°, substantially of a paraboloid of revolution with focus 4, resulting from the rotation of a parabola about the rotation axis 1 with an angle of rotation α, whereby a straight line intercepting perpendicularly the rotation axis 1 at the focus 4 contacts the parabola in the projected focal point 3 (FIG. 1 and FIG. 7).

Figure 2:
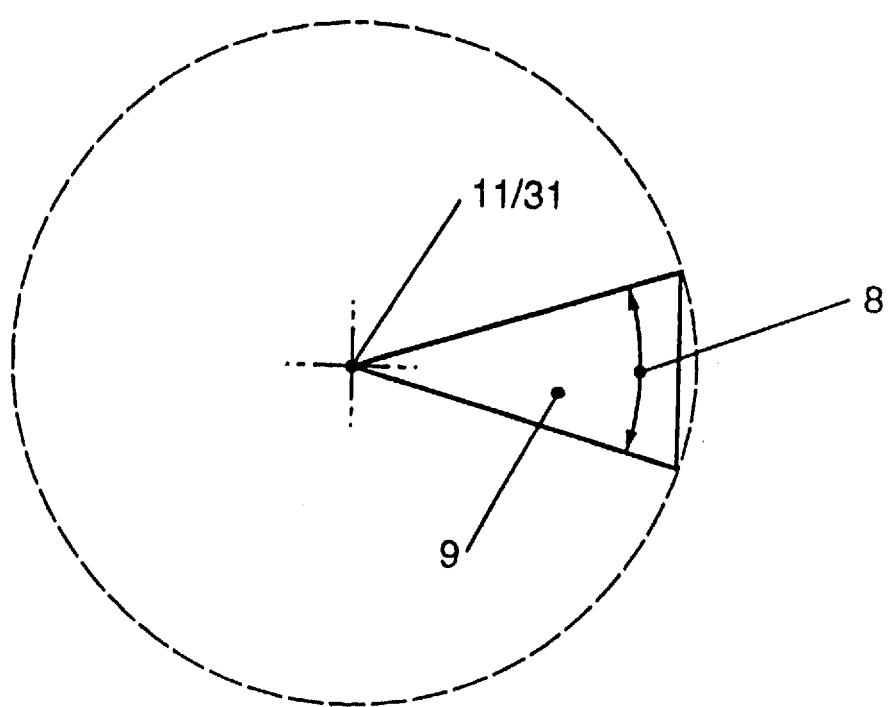
FIG. 2 the schematic plan view of the inner segment of the inventive ultrasonic sensor.
Figure 3:
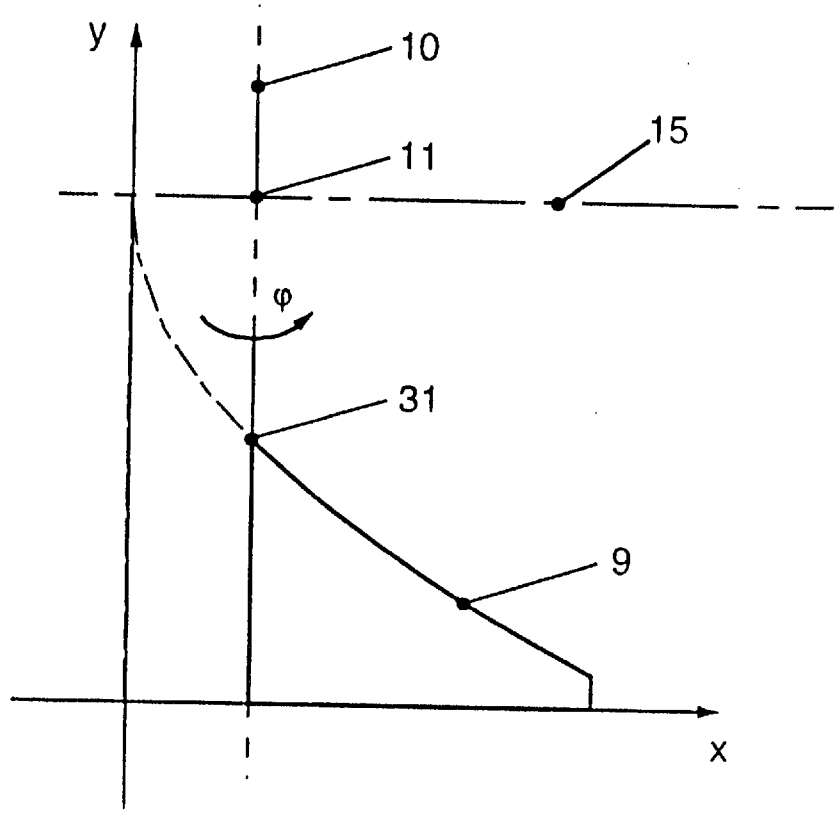
FIG. 3 the schematic side view of the inner segment of the inventive ultrasonic sensor.

In a preferred embodiment the reflective surface 9 of the inner segment 17 can be part of the surface that is formed by rotation of a parabola about the axis 10 which corresponds to the straight line which extends perpendicularly to the symmetry axis 15 of the parabola at the focal point 11 of the parabola and which intercepts the parabola at the projected focus 31 (FIG. 2, FIG. 3, FIG. 4). It is advantageous when the reflective surface 9 begins at the projected focus 31 of the vertical projection of the focus 11 and extends in the direction away from the vertex.

In a further embodiment of the reflective surface of the inner segment 17 of the inventive ultrasonic sensor, the rotation of the parabola about the axis 10 can be performed with the angle of rotation ψ, (FIG. 3 and FIG. 4). In a preferred embodiment the angle of rotation ψ corresponds to the amount 8 of the opening angle ψ of 0° to 180°, preferably of 0° to 90°, most preferred of 25° to 45°. Most preferred is the angle of rotation ψ when it corresponds to the amount 8 of the opening angle ψ of 30°, 35° or 40°.

It is advantageous when the outer segments 14a, 14b are arranged with the inner segment 17 such that the focal points 14, 11 coincide and the projected focal points 3, 31 coincide, whereby the reflective surfaces 2, 9 of the outer segments 14a, 14b and of the inner segment 17 form a substantially continuous surface. Continuous surface means, for example, also a smooth surface without uneven portions that could disturb reflection. A mounting of the ultrasound transducers 12 with its active surface 13 in the ultrasound sensor such that the center point of its active surface 13 coincides with the focal point 4, 11 is advantageous, whereby the main radiation direction of the ultrasonic transducer 12 is directed toward the projected focal point 3, 31. The opening angle of the sound cone of the ultrasonic transducer 12 is 5 to 120°, preferably 50° to 80°, more preferred 60°.

In an advantageous embodiment of the ultrasonic sensor the inner segment 17 can be embodied so as to be expandable, whereby the outer segments 14a, 14b are pivotable by an angle of rotation β about a common axis 85 which may extend through the focal points 4, 11 and the projected focal points 3, 31. It is possible in this context that the angle of rotation β corresponds to the amount 8 of the opening angle ψ of the inner segment 17. Thus, the detecting area of the ultrasonic sensor can be changed as desired in the horizontal plane depending on the requirements (FIG. 7).

In FIG. 7 the reference numeral 80 indicates the back, 82 the top, and 81 the bottom of the inventive ultrasonic sensor.

Figure 5:
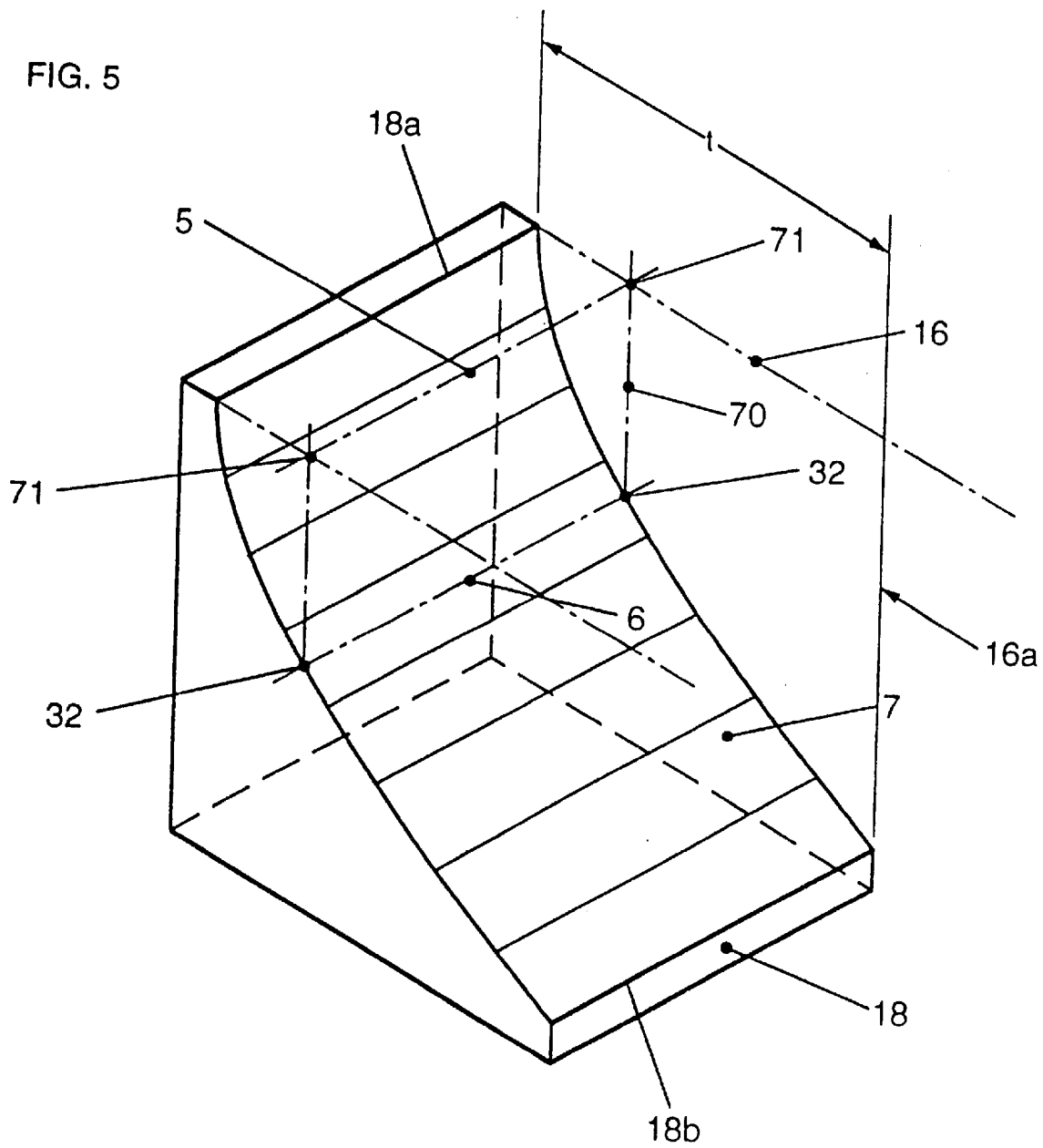
FIG. 5 the perspective representation of the center piece of the inventive ultrasonic sensor.
Figure 8:
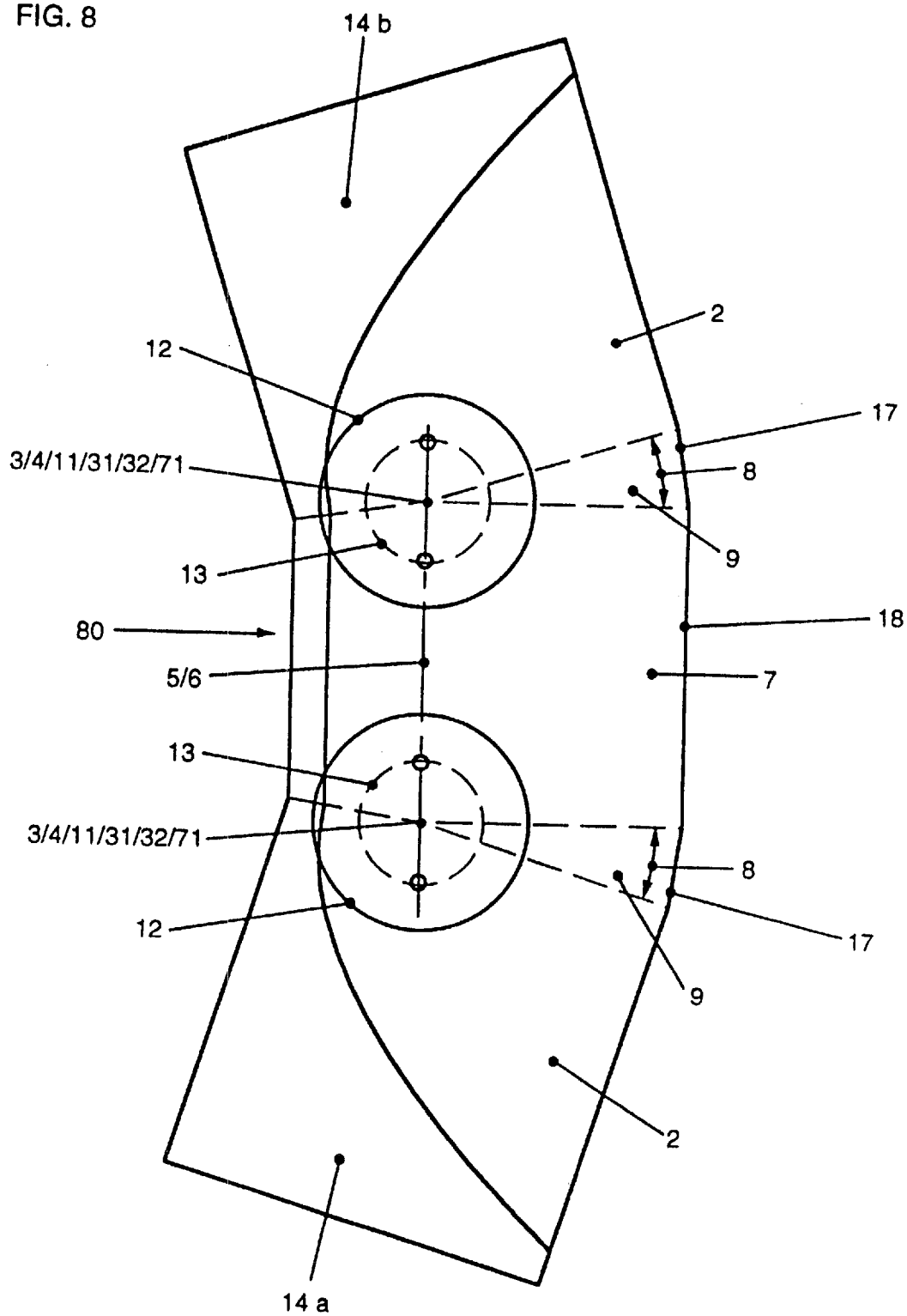
FIG. 8 the plan view of the inventive ultrasonic sensor with two outer segments, two inner segments, a center piece, and two ultrasonic transducers.

In another advantageous embodiment of the inventive ultrasonic sensor the reflector 90 can be comprised of two outer segments 14a, 14b, two inner segments 17, and a center piece 18 (FIG. 8 and FIG. 9) whereby the center piece 18 has a reflective surface 7 which is embodied as a part of a parabolic surface which is formed by a linear horizontal displacement of a vertically extending parabola the symmetry axis 16 of which extends horizontally (FIG. 5). The straight line 5 connects the focal point 71 of the original (i.e. undisplaced) parabola with the focal point 71 of the horizontally displaced parabola. The straight line 6 connects the projected focus 32 of the original, non displaced, parabola to the projected focal point 32 of the horizontally displaced parabola.

A straight line 70 which extends perpendicularly to the symmetry axis 16 on the focal point 71 of the parabola, intercepts the parabola at the projected focal point 32. It is possible, when the center piece 18 is arranged accordingly with one of the inner segments 17 and one of the outer segments 14a, that the focal points 4, 11, 71 coincide and the projected focal points 3, 31, 32 coincide, whereby the reflective surface 2 of the outer segment 14a, the reflective surface 9 of the inner segment 17, and the reflective surface 7 of the center piece 18 form a substantially continuous surface.

Furthermore, the center piece 18 can be arranged with the other of the inner segments 17 and the outer segment 14b such that the focal points (4, 11, 71) coincide and the projected focal points (3, 31, 32) coincide whereby the reflective surface 2 of the outer segment 14b, the reflective surface 9 of the inner segment 17, and the reflective surface 7 of the center piece 18 form a substantially continuous surface.

When a spreading of the sound field in the horizontal plane is not required, a compression of the detecting area in the vertical direction is possible only by employing the center piece 18 in the inventive ultrasonic transducer. In this context, the center piece 18 can be embodied substantially longer in the direction of the straight line 6 and the length of the straight line 6 can be a plurality of the length of the straight line which intercepts the points 71 and 16 (FIG. 5).

It is advantageous when two ultrasonic transducers 12 are arranged in an ultrasonic sensor whereby a first ultrasonic transducer 12 emits the ultrasonic impulses and a second ultrasonic transducer 12 receives the echo of the ultrasonic impulses. The functional specialization of the ultrasonic transducer 12 increases the acoustic effectiveness of the ultrasonic sensor because the ultrasonic transducer can be optimized with regard to the corresponding task "sending" and "receiving" and the typical dead zones of ultrasonic sensors can be reduced.

Since vehicles have, for example, different width, the detecting areas of the ultrasonic sensors must be adapted to these varying sizes. This can be achieved already with two ultrasonic sensors with a corresponding adjustment of the two outer segments 14a and 14b without, as was needed in the prior art, having to produce a special ultrasonic sensor.

Furthermore, it is advantageous that in this context the ultrasonic transducer 12 with their active surface 13 are arranged such that the center point of their active surfaces 13 coincide with the focal points 4, 11, 71 whereby the main radiation direction of the ultrasonic transducer 12 may be directed toward the projected focal points 3, 31, 32. Due to this arrangement of the ultrasonic transducer or transducers 12 a cone-shaped design of the sound field at the side facing the top side 82 is prevented so that a sound characteristic results which exhibits a great focusing of the sound cone so that it is substantially asymmetrically embodied. It is advantageous, when the main radiation direction of the ultrasonic transducer 12 is directed onto the projected focal points 3, 31, 32 whereby preferably the opening angle of the sound cone of the ultrasonic transducers 12 is 5° to 120°, preferably 50 to 80°, even more preferred 60°.

The inventive ultrasonic sensor can be coupled to a vehicle such that either the bottom side 81, i.e., the side which is opposite to the ultrasonic transducer or transducers 12, or the upper side 82, i.e., the side on which the ultrasonic transducer or transducers 12 are provided, faces the ground surface. In the case of arranging the inventive ultrasonic sensors with the top side 82 facing the ground surface, the side of the sound cone facing the ground surface extends substantially parallel to the ground surface.

Figure 9:
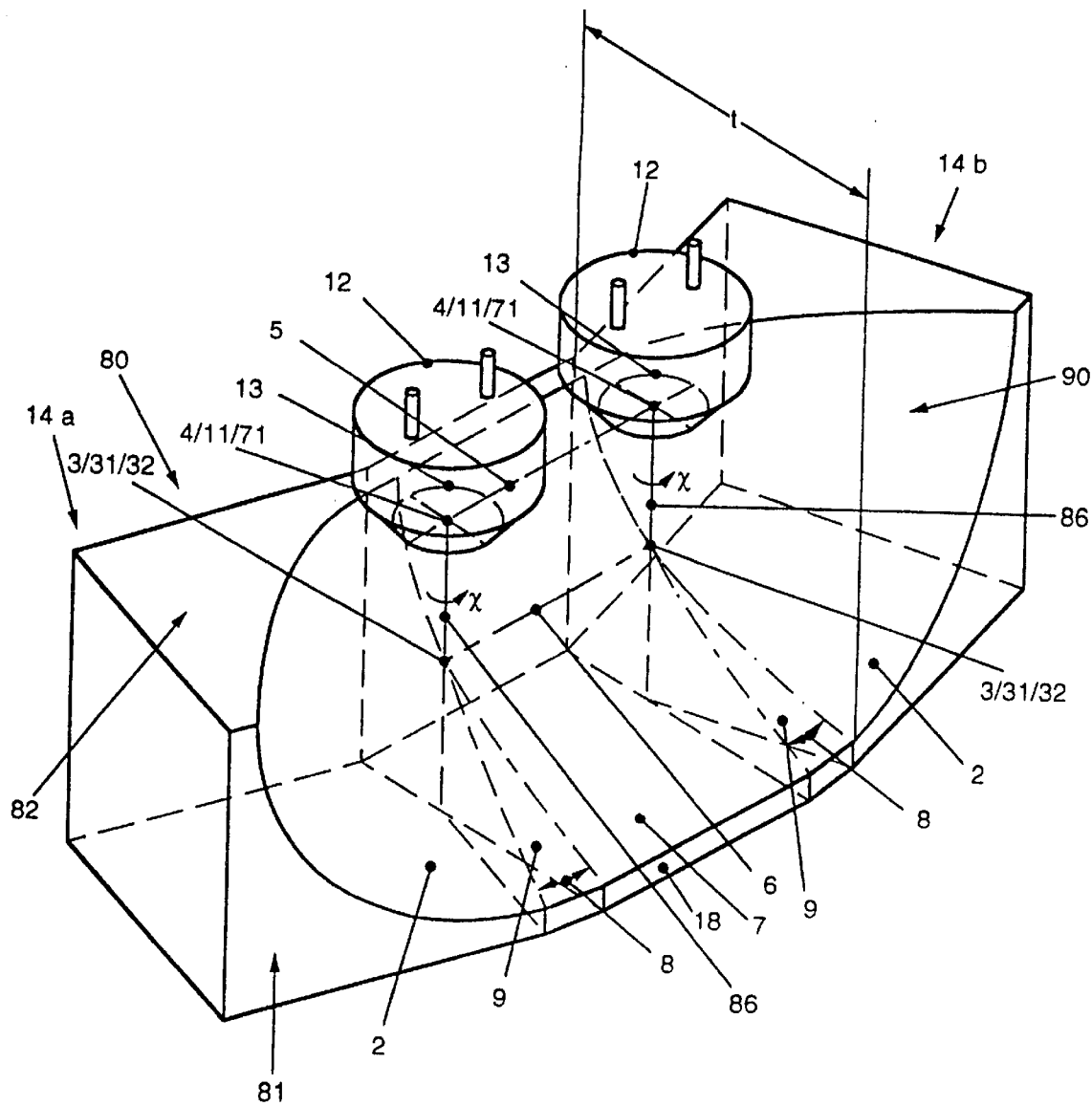
FIG. 9 the perspective representation of the inventive ultrasonic sensor with two outer segments, two inner segments, a center piece, and two ultrasonic transducers.

It is also possible that the inner segments 17 are embodied so as to be spreadable whereby the outer segments 14a, 14b are pivotable about an angle of rotation $\chi$ about an axis 86 which extends through the focal points 4, 11, 71 and the projected focal points 3, 31, 32 (FIG. 9). The angle of rotation $\chi$ can have the amount 8 of the opening angle $\psi$ of the corresponding inner segment 17.

Preferably, the frequency range of the ultrasonic transducer is used in the inventive ultrasonic sensors is between 20 to 200 kHz, preferably 30 to 50 kHz, most preferred between 33 and 40 kHz.

The depth t of the reflective surface has a value that is a multiple of the wavelength of the used ultrasonic frequency. In one embodiment, the depth t of the reflective surface can preferably have the two to twenty fold wave length of the used ultrasonic frequency, preferably the two to ten fold wave length, especially preferred the three to five fold wavelength.

The depth t of the reflective surface is the distance between the vertex of the parabola (edge 18a in FIG. 5) and the point of interception of the symmetry axis 16 with the straight line 16a. The straight line 16a cuts the lower edge 18b of the parabolic surface (FIG. 5).

The roughness of the surface of the reflector 90 should be such that at least it is below the wavelength with which the ultrasound transducers are operated. It is also possible to approximate the parabolic surface by providing a plurality of smaller surface segments.

By providing the possibility to vary the detecting range of the ultrasonic sensor as desired in the horizontal plane, depending on the requirements, without changing the construction or the devices as such, a wide field of application of different nature is opened for the inventive ultrasonic sensor.

Due to the fact that it is not required to provide different ultrasonic sensors for different applications in different constructions, arrangements of ultrasonic transducers etc., but instead one ultrasonic sensor is sufficient in order to fulfill all requirements in regard to the different monitoring areas, e.g. variations of the monitoring range, precision, and contour sharpness of the sending and receiving cones, small dimensions in the construction size etc., an ubiquitous application in many industrial and private fields is opened; additionally, the manufacturing cost are greatly reduced, because only one ultrasonic sensor is needed, in order to fulfill all the respective requirements of all fields with respect to inexpensive monitoring possibilities.

Accordingly, the application of the inventive ultrasonic sensor as a running board monitoring device of passenger vehicles or payload vehicles, especially garbage trucks, as monitoring devices within or external to spaces whereby spaces include buildings and passenger compartments of vehicles.

All segments of the reflector are combined to a body with a continuous inner contour that has a continuously inwardly slanted inner surface forming the active surface of the reflector. The inner segment 17 are expandable, and the position of the outer segments 14a, 14b, relative to the position of the inner segments 17, is thus changeable as a function of the spreading action. Upon widening or narrowing the position of the outer segments 14a, 14b relative to one another about the angle of rotation $\beta$, respectively, $\chi$ the continuous inner contour of the inwardly slanted inner surface of the reflector remains substantially intact.

Of course, the ultrasonic sensor can also be embodied with segments that are fixedly arranged relative to one another when the connecting location and the spatial area to be monitored are known from the beginning. This allows for a very inexpensive embodiment of the ultrasonic sensor. For example, a vehicle can have one or more inventive ultrasonic sensors.

When in the inventive ultrasonic sensor separate ultrasonic transducers for sending and receiving the echo signals are provided, the advantage results that already during the sending of the sound impulses the first echo signals can be read and evaluated. Thus, the dead zone within the narrow range of conventional ultrasonic sensors is drastically reduced. This is especially important for ultrasonic sensors that are used as a parking aid in passenger vehicles because only in this way objects can be detected that are very close to the inventive ultrasonic sensor.

In a very advantageous embodiment, the inventive ultrasonic sensor can be connected to a control unit for controlling the ultrasonic sensors 12 as well as the reception and amplification of the echo signals, an evaluating unit for evaluating the transformed impulses of the ultrasonic transducer 12, a display device for representing the detected values and/or a transmitting device. As a display device an acoustic and/or optical device can be used. In the case of using a plurality of ultrasonic sensors, they can be coupled to a subsequent switching device or central control device in order to avoid mutual influencing of the ultrasonic transducers, respectively, sensors. The control device synchronizes all connected ultrasonic transducers, respectively, sensors and processes the signals.

It has been shown in practice that it is very advantageous to process the weak echo signals first directly electronically at the ultrasonic transducer and to send the amplified echo signals to the central control device. It is also useful to generate the sending impulse in the vicinity of the ultrasonic transducer so that the central control device only needs to send a trigger impulse to the connected ultrasonic sensor. Advantageously, the inventive ultrasonic sensor thus already includes an electronic circuit that generates from the external trigger signal the sending impulse and processes the weak echo signals such that they can be transmitted without problem via great line lengths to a central control unit (electronic and electrical connectors are not represented in the drawing in order to simplify them.

The standard proposal DIN 75 031 of May 1993 dictates, among other things, that the ultrasonic sensors in range warning devices are to be continuously monitored and the failure of an ultrasonic sensor is to be optically and acoustically indicated to the driver. In connection with the increasingly tightened product liability by the manufacturer, a monitoring of the ultrasonic sensors is desirable also in parking aids for personal vehicles.

When using two ultrasonic transducers in the inventive ultrasonic sensors, in which the reflector 90 comprises two outer segments 14a, 14b, two inner segments 17, and a center piece 18, a method for sensor monitoring can be performed as follows:

emitting a sound impulse as a testing impulse through the first ultrasonic transducer 12 at a point in time when the amplifier for the echo signals of the second ultrasonic transducer 12 has reached its maximum amplification and testing with the evaluation device whether the second ultrasonic transducer 12 has received the sound impulse reflected at the sound deflecting surface of the ultrasound transducer 12.

With the inventive ultrasonic sensor with separate ultrasonic transducers for sending the sending impulses and for receiving the echo signals, the ultrasonic transducers can advantageously be monitored with the following method by the central control unit:

It is known that in the echo propagation time measurement the electronic amplifier for the echo signals must increase its amplification factor with increasing distance between ultrasonic sensor and reflectors, respectively with increasing echo propagation time. Therefore, for such tasks, according to the prior art, amplifiers are used that are controlled as a function of the propagation time. Preferably, the ultrasonic sensor should then be monitored when the echo amplifier has reached its maximum sensitivity.

When the sending transducer emits at maximum sensitivity of the echo amplifier a short ultrasonic impulse, this sending impulse can be impinged via the inventive reflective surface 90 directly onto the receiving transducer and can be received thereat. The control unit can thus check individually for each ultrasonic transducer whether for maximum sensitivity of the echo amplifier this testing impulse is received by the receiving transducer.

When the echo amplifier does not supply a signal after emission of a testing signal, there is either an error within the sending path (the sending transducer, for example, has not emitted a sound impulse) or the receiving path has failed (the ultrasonic sensor is no longer capable of evaluating echo signals).

It should be noted that with the inventive method it is also possible to detect cable breakage or a short circuit within the supply lines to the ultrasonic sensors.

Advantageously, the inventive testing method is included into the current ultrasonic measurements. This ensures that with each ultrasonic measurement the ultrasonic sensors are checked.

An even more advantageous method for monitoring the ultrasonic sensors results with the following method: The method for sensor monitoring with use of at least two inventive ultrasonic sensors is characterized in that at least two ultrasonic sensors with one or more ultrasonic transducers 12 are aligned at motor vehicles or payload vehicles such relative to one another that the ultrasonic impulse of one ultrasonic sensor is received without reflection as a direct beam by the other ultrasonic sensor, a sound impulse is emitted as a testing impulse by the ultrasonic transducer 12 of the one ultrasonic sensor and it is checked by an evaluation unit whether the ultrasonic transducer 12 of the other ultrasonic sensor has received the sound impulse after the sound propagation time and vice versa.

This method, in contrast to the first above described method is also suitable for ultrasonic sensors which operate with only one ultrasonic transducer. This method can especially be used when applying the ultrasonic sensors as parking aids or maneuvering warning devices for motor vehicles.

Due to the great opening angle of the inventive ultrasonic sensor in the horizontal plane, the rearward area of the vehicle can be completely monitored with two ultrasonic sensors. For example, two of the inventive ultrasonic sensors are rearwardly attached to the outer left and outer right at the vehicle. The two ultrasonic sensors, in a plan view of the horizontal detecting area (FIG. 13) are aligned relative to one another, i.e., are inwardly slanted, such that the outer areas of the detecting range are substantially parallel to the lateral outer edges of the vehicle (FIG. 13).

When the horizontal opening angle of the inventive ultrasonic sensors are selected to be sufficiently large, the ultrasonic sensors will impinge on one another. The control unit controls the two ultrasonic sensors alternatingly. When the left ultrasonic sensor has emitted a sending impulse, the right ultrasonic sensor receives this sound impulse as a direct beam. The control unit is then even able, based on the sound propagation time between the sending of the impulse and the receiving of the directly impinging impulse at the right ultrasonic sensor, to determine whether the sensors are arranged at the correct distance to one another at the vehicle. When the directly impinging sound impulse is not received, either the left ultrasonic sensor has not emitted an impulse at all or the right ultrasonic sensor is unable to receive the sound impulse or a larger object is positioned between the two ultrasonic sensors.

This testing is, of course, also performed in the opposite direction by the control unit. Then, the right ultrasonic sensor emits a sound impulse and the left ultrasonic sensor is checked with regard to receiving the directly impinging impulse.

This testing method also is able to detect a short circuit and cable breakage in the cable system between the control unit and the connected ultrasonic sensors.

This testing method can, of course, also be used with three or more ultrasonic sensors. It is important that the ultrasonic sensors which are testing one another "see" on another with a direct beam.

Furthermore, the inventive ultrasonic sensor can be used for sensing, respectively, detecting the spatial area about a vehicle at the rear, the front, the driver's side and/or the passenger side whereby, for example, one or more inventive ultrasonic sensors are connected to at least one bumper and, for example, the visible surface of the ultrasonic sensors forms a substantially continuous surface with the visible surface of the bumper. Furthermore, the inventive ultrasonic sensor can be incorporated into at least one rear light, a head light, a reflector of the rear light and/or of the head light and/or into at least one part of the vehicle such as the fender, driver's door, passenger door, and side panels, for example, the running board (FIG. 13, FIG. 14, and FIGS. 15–16).

Since already with two of the inventively designed ultrasonic sensors a vehicle can be secured gap-free over the entire width thereof, the inventive ultrasonic sensors can be integrated, similar to the conventional lighting devices, into the vehicle design. It is even possible to integrate the inventive ultrasonic sensors, for example, together with the rearlight or into the rear light in the motor vehicle.

In a motor vehicle the inventive ultrasonic sensor can be arranged such that the ultrasonic sensor with its back 80 is rotatably supported about an axis which extends preferably substantially perpendicularly to the surface of the part of the motor vehicle to which the ultrasonic transducer is connected. The bottom side 81 of the inventive ultrasonic sensor can be aligned perpendicularly or horizontally to the ground surface.

Exemplary Embodiment

According to FIG. 13, at a payload vehicle inventive ultrasonic sensors are arranged below the bumper as well as at the level of the vehicle to the right and to the left such that their top side 82 is facing the ground surface or facing away from the ground surface. The ultrasonic sensors connected below the bumper are arranged such that the side of the detecting area facing the ground surface extends substantially parallel to the ground surface. This means that low curbs as well as objects positioned on the ground surface and having a low height will not reflect the ultrasound sending impulse. Furthermore, the sending and receiving cones have sharp contours. Moreover, it is to be noted that the two inventive ultrasonic sensors are sufficient to cover the entire rear monitoring area of the vehicle. In contrast to conventional ultrasonic sensors, it is thus no longer necessary to attach four to six conventional ultrasonic sensors over the entire width of the vehicle along the bumper.

The inventive ultrasonic sensors have a reflector 90 with reflective surface that is comprised of parabolic surfaces of second order with two outer segments 14a, 14b, two inner segments 17, and a center piece 18. The outer segments 14a, 14b have reflecting surfaces 2 in the form of 90° segments of substantially a paraboloid of revolution with the focus 4 that results from rotation of the parabola with an angle of rotation α about its rotational axis 1 whereby a straight line intercepting perpendicularly the axis of rotation 1 at the focus 4 contacts the parabola at the projected focal point 3. The reflecting surface 9 of the inner segment 17 is embodied as a parabolic surface and is part of the surface that is formed by rotation of a parabola about the axis 10 which corresponds to the straight line that at the focal point 11 of the parabola extends perpendicularly to the symmetry axis 15 of the parabola and intercepts the parabola at the projected focal point 31. The center piece 18 has a reflecting surface 7 which is embodied as a part of a parabolic surface which is generated by a linear horizontal displacement of a vertically extending parabola the symmetry axis 16 of which extends horizontally. The center piece 18 is designed such that a straight line 70, which extends perpendicularly to the symmetry axis 16 at the focal point 71 of the parabola, intercepts the parabola at the projected focal point 32. The center piece 18 is arranged with an inner segment 17 and an outer segment 14a such that the focal points 4, 11, 71 coincide and the projected focal points 3, 31, 32 also coincide whereby the reflective surfaces 2, 9, 7 of the outer 14a and the inner 17 segments and the center piece 18 form a substantially continuous surface. The center piece 18 is arranged with the other of the inner segments 17 and the other of the outer segments 14b such that the focal points 4, 11, 71 coincide and the projected focal points 3, 31, 32 coincide whereby the reflecting surfaces 2, 9, 7 of the outer 14b and the inner 17 segments and the center piece 18 form a substantially continuous surface. The two ultrasonic transducers 12 are arranged with their active surface such that the center point of its active surfaces 13 coincides with the focal points 4, 11, 71.

The angle of rotation α is 90°. The angle of rotation χ that corresponds to the amount 8 of the opening angle ψ of the inner segments 17 is 17.5°. The two outer segments 14a, 14b, the two inner segments 17, and the center piece 18 are made of plastic material for example, polyurethane. Flexural resonators of a closed construction with an ultrasonic frequency of 40 kHz are used as ultrasonic transducers. The surface roughness of the reflectors 90 is below the wave length λ of the used ultrasonic frequency by a factor 10.

The inventive ultrasonic sensors attached at the vehicle level allow with their asymmetric detecting range that objects which are positioned at a small distance above the vehicle roof will not reflect the sending impulses and thus do not give the user the wrong impression that obstacles are present at the vehicle level. These ultrasonic sensors, provided as an upper edge protection, are of course optional. They are mentioned to emphasis that optionally in a second plane further ultrasonic sensors can be arranged in order to produce a desired result.

The present invention is, of course, in no way restricted to the specific disclosure of the specification and drawings, but also encompasses any modifications within the scope of the appended claims.

What I claim is:

1. An ultrasonic sensor for performing at least one function selected from the group of sensing a spatial area and of measuring contactless a distance, said ultrasonic sensor comprising:

at least one ultrasonic transducer for performing at least one function selected from the group of sending ultrasonic impulses and receiving the echo of the ultrasonic impulses;

a device for concentrating the energy of the ultrasonic impulses onto a spatial area to be sensed and for concentrating the energy of the echo of the ultrasonic impulses onto the at least one ultrasonic transducer;

said device for concentrating the energy having a reflector with a reflective surface;

said reflective surface comprised of parabolic surfaces of second order;

said reflector comprising reflector segments that are fixedly or movably connected to one another;

wherein a first and a second of said reflector segments are outer segments having reflective surfaces that are paraboloid segments of 50° to 120° of a paraboloid of revolution with a first focal point, said paraboloid of revolution generated by a rotation of a first parabola about an axis of symmetry thereof by an angle of rotation α;

wherein a straight line, intercepting said axis of symmetry of said first parabola at said first focal point, contacts said first parabola at a second focal point that is a vertical projection of said first focal point;

wherein a third of said reflector segments is a first inner segment having a reflective surface embodied as a parabolic surface.

2. An ultrasonic sensor according to claim 1, wherein said reflective surface of said first inner segment is a portion of a surface generated by rotation of a second parabola about a rotation axis, defined as a straight line extending perpendicularly to an axis of symmetry of said second parabola through a third focal point of said second parabola and intercepting said second parabola at a fourth focal point that is a vertical projection of said third focal point, wherein said reflective surface of said first inner segment begins at said fourth focal point and extends in a direction away from the vertex of said second parabola.

3. An ultrasonic sensor according to claim 2, wherein the rotation of said second parabola about a rotation axis is carried out with an angle ψ.

4. An ultrasonic sensor according to claim 3, wherein said outer and said inner segments are arranged such that said first and third focal points coincide and said second and fourth focal points coincide, wherein said reflective surfaces of said outer and said inner segments form a substantially continuous surface, wherein said at least one ultrasonic transducer has an active surface and wherein said active surface is arranged such that a center point of said active surface coincide with said first and third focal points.

5. An ultrasonic sensor according to claim 4, wherein a main beam direction of said at least one ultrasonic transducer is oriented toward said second and fourth focal points.

6. An ultrasonic sensor according to claim 5, wherein a fourth of said reflector segments is a second inner segment and wherein a fifth of said reflector segments is a center piece, wherein said center piece has a reflective surface that is a portion of a parabolic surface generated by linear displacement of a vertically extending parabola having an axis of symmetry extending horizontally.

7. An ultrasonic sensor according to claim 6, wherein said vertically extending parabola has a fifth focal point and wherein a straight line, extending perpendicularly to said axis of symmetry at said fifth focal point, intercepts a sixth focal point that is a projection of said fifth focal point.

8. An ultrasonic sensor according to claim 7, wherein:

said center piece is arranged with one of said outer segments and one of said inner segments such that said first, third and fifth focal points coincide and said second, fourth and sixth focal points coincide, wherein said reflective surfaces of said outer and inner segments and said center piece form a substantially continuous surface; and said center piece is arranged with the other of said outer segments and the other of said inner segments such that said first, third and fifth focal points coincide and said second, fourth and sixth focal point coincide, wherein said reflective surfaces of said outer and inner segments and said center piece form a substantially continuous surface.

9. An ultrasonic sensor according to claim 8, wherein said active surface of said at least one ultrasonic transducer is arranged such that said center point coincides with said first, third, and fifth focal points and wherein said main beam direction of said at least one ultrasonic transducer is oriented toward said second, fourth, and sixth focal points, wherein said at least one ultrasonic transducer has a sound cone with an opening angle of 5° to 120°.

10. An ultrasonic sensor according to claim 9, wherein said outer segments are rotatable by an angle $\chi$ about an axis extending through said first, third, and fifth focal points and said second, fourth, and sixth focal points, wherein said angle $\chi$ is identical to said angle $\psi$ of said first inner segment.

11. An ultrasonic sensor according to claim 1, wherein said reflective surfaces of said outer segments are paraboloid segments of 90° of a paraboloid of revolution.

* * * * *